3,411,009
RADIATION SENSITIVE APPARATUS FOR
DETECTING DIRT IN TRANSPARENT
BOTTLES
Geoffrey Ewart Ford and Jeffrey Jerome Sainsbury, Bedford, England, assignors to Fords (Fensbury) Limited, Bedford, England, a British company
Filed Oct. 5, 1964, Ser. No. 401,600
7 Claims. (Cl. 250—223)

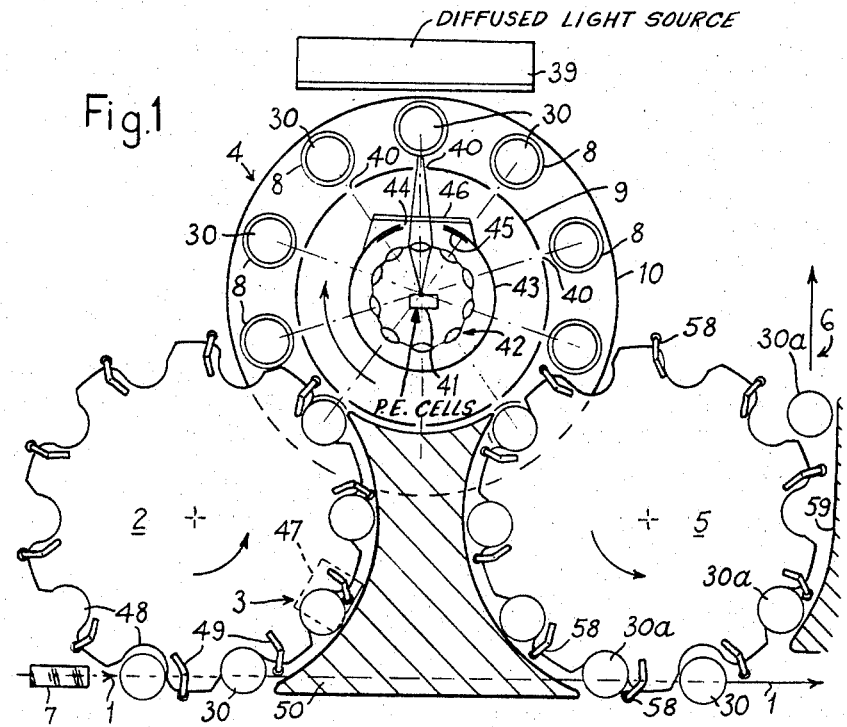
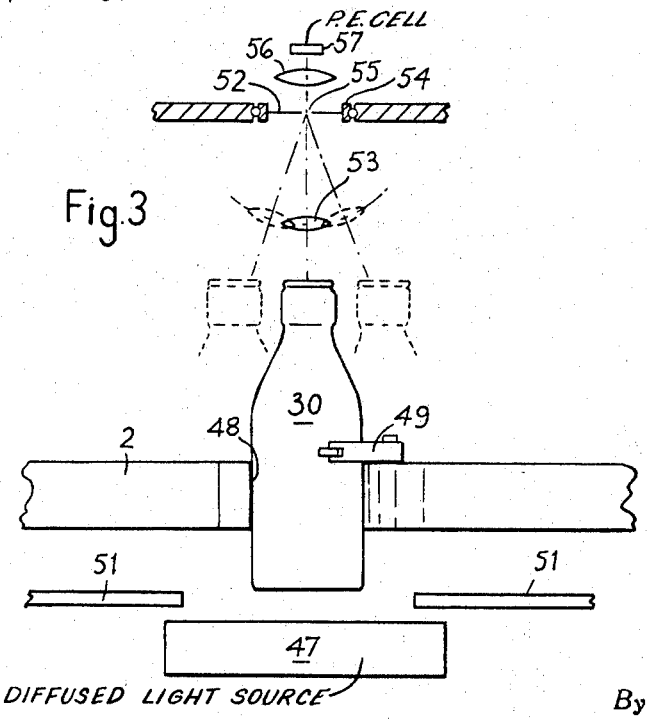

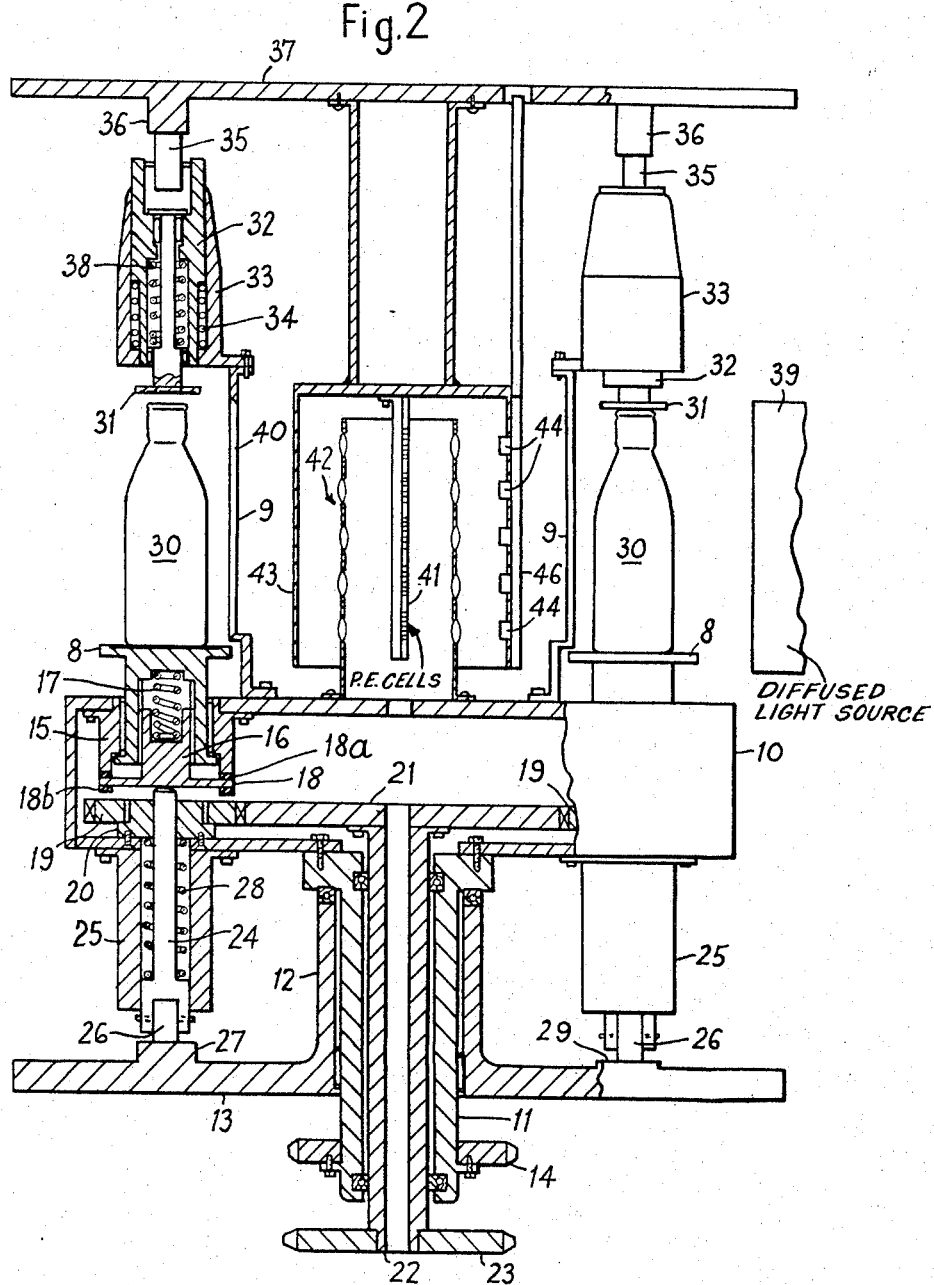

ABSTRACT OF THE DISCLOSURE

The invention relates to photo-electric inspection apparatus for the detection of dirt or foreign bodies in transparent bottles in which the bottle is rotated between a diffusing light source and a row of photo-electric cells and is scanned by a slit as the bottle rotates.

Summary of the invention

The present invention relates to apparatus for the detection of dirt in transparent bottles before they are filled and offered for sale, particularly in bottles such as milk bottles or beer bottles, which are re-used after washing. Such bottles, after recovery from the customer, are washed for re-use but before they are refilled they must be thoroughly inspected to make sure that they are not dirty or contain foreign bodies or glass chips which may not have been removed by the washing operation. This inspection is generally performed visually, and the present invention has for its object to provide an apparatus whereby this inspection may, at least partially, be effected by automatic means.

The invention consists in apparatus for optically scanning the side walls or base of a bottle to detect irregularities which might indicate the presence of dirt or a foreign body in the bottle, wherein the wall or base to be inspected is illuminated by a diffused light source and scanned by a narrow slit arranged in front of a photo-sensitive device or stack of photo-sensitive devices. Preferably optical means are provided for focussing an image of the slit or the wall or base of the bottle on to the photo-sensitive device or devices. Any bottle producing a signal indicating such an irregularity can be automatically rejected so that it can be checked for faults by visual inspection.

Two optical scanning means for the side wall and base can be combined in a single machine through which the bottles pass in sequence and have their side walls and bases optically scanned in different stages of the machine, the output signals from the scanning devices being stored in a memory device so that any bottle which shows an irregularity with either scanning will be rejected in a subsequent reject stage of the machine, those bottles which do not show any irregularity being discharged, for example, on to a conveyor for transfer to a filling machine.

In one embodiment, the apparatus for scanning the side walls of a bottle according to this invention comprises a rotatable pedestal on which the bottle to be inspected is rotated in front of a diffused light source which will illuminate the total side wall surface of the bottle, excluding the base, the illuminatetd bottle being scanned through a narrow vertical slit by a series of photocells stacked vertically, an optical system being provided for focussing the slit or that part of the wall of the bottle adjacent to the photocells on to the photocells. The bottles may be advanced continuously through the machine while they are being rotated and inspected, in which case the narrow scanning slit will travel with the bottle. The bottle is rotated through at least one complete revolution while it is being scanned.

The apparatus for optically scanning the base comprises means for holding the bottle so that its base is completely clear of obstruction while the base is illuminated by a diffused light source, optical means being provided for producing an image of the illuminated base, which image is scanned by a rotating slit arranged in front of a photocell. The bottles may be continuously advanced while the base is being scanned in which case optical means are provided for holding the image of the base stationary while it is being scanned by the rotating slit.

In order that the invention may be more clearly understood, reference will now be made to the accompanying drawings, in which:

FIG. 1 shows a diagrammatic plan view of a machine for carrying out the invention.

FIG. 2 is a diagrammatic section through the side inspection unit taken on the line A—A in FIG. 1.

FIG. 3 is a diagrammatic side view of a fragment of the base inspection apparatus.

Figure 4:
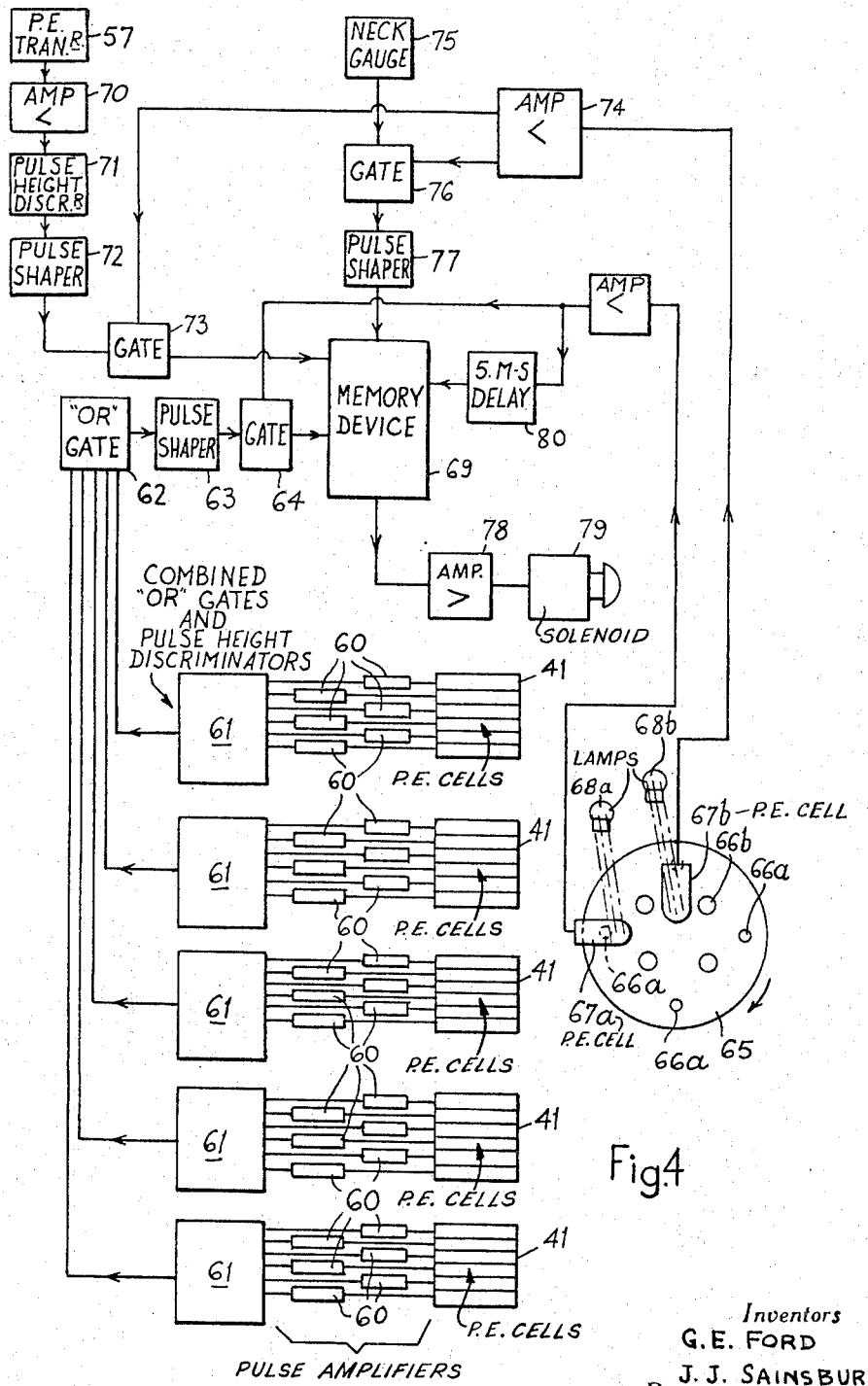
FIG. 4 shows a block circuit diagram of the means for controlling the reject mechanism.

Referring to FIG. 1, the machine is supplied with bottles to be inspected by a conveyor 1, from which the bottles are taken off by the input star 2, which includes the base inspection unit 3, and transferred to the side inspection unit 4. After passing through the side inspection unit the bottles are removed by the exit star 5 which incorporates means for rejecting into the area 6 any bottles which have produced signals indicating irregularities which call for visual inspection. Clean bottles are returned to the conveyor 1 for transfer to the filling machine.

Bottles conveyed to the machine at a desired speed, for example 400 a minute, will pass through a spacing screw 7 and into the input star wheel 2 which transfers each bottle on to one of the bottle pedestals 8 of the side inspection unit 4. The pedestals are arranged circumferentially around and close to the cylindrical wall 9 carried by the box-like turret table 10 which is rotatable by a hollow spindle 11 rotatable in a bearing member 12 in the base plate 13. The spindle 13 is rotated by a sprocket wheel 14 coupled to a drive motor and to sprockets (not shown) driving the input and output stars, the arrangement being such that the turret table 10 is rotated at the same speed as the stars 2 and 5. The pedestals 8, of which there are eight in the embodiment shown, are rotatably mounted in bearing members 15 carried by the upper wall of the turret table. Keyed to and rotatable with the pedestal is a plunger 16, which is urged downwards by the spring 17 and carries a driving disc 18 at its lower end. This driving disc has rings of friction material 18a, 18b secured to the peripheral zones of its upper and lower surfaces respectively. When the driving disc 18 is moved downwards by the spring 17, the friction ring 18b engages the surface of an associated pinion 19, which is rotatable on a bearing 20 carried by the lower wall of the turret table, all the pinions 19 being rotated simultaneously by a gear wheel 21 driven by a shaft 22 extending through the bore of the hollow spindle 11 and provided with a driving sprocket 23 at its lower end. Each driving disc 18 can be moved upwards by an associated push rod 24 slidable in a guide 25 and provided at its lower end with a roller 26 which rolls along an annular cam track 27 on the base plate 13. The roller 26 is urged downwards into contact with the cam track 27 by the spring 28. The cam track normally holds the push rod 24 up to keep the driving disc 18 raised with its friction ring 18a in contact with the braking ring formed by the bottom surface of the bearing member 15 to hold the associated pedestal 8 against rotation. In one section, however, corresponding to the position where the sides of the bottles are to be inspected, the cam track 27 has a dwell 29 which allows the push rod 24 and the driving disc 18 to move downwards, whereby the friction ring 18*b* comes into contact with the rotating pinion 19 and the pedestal 8 is rotated at the desired speed. As soon as the roller 26 moves from the dwell on to a raised part of the cam track 27, the drive to the pedestal 8 is disconnected and the pedestal is braked and held stationary.

During rotation each bottle 30 is clamped on its pedestal by a clamping member 31 mounted in a plunger 32 slidable in a guide 33 carried from the top of the cylindrical wall 9. The plunger 32 is urged upwards by a spring 34 in order to maintain a roller 35 at its upper end in contact with an annular cam track 36 on the underside of a top plate 37 supported by a pillar (not shown) from the base plate 13 so as to be held at a predetermined height above the base plate. The cam track 36 is shaped so that the clamping member 31 is raised above the top of a bottle neck while a bottle is being placed on a pedestal 8 by the input star 2 or is being removed from a pedestal by the output star 5, and so that the plunger 32 will be moved downwards to cause the clamping member 31 to clamp the associated bottle 30 while the pedestal is rotating. Clamping pressure is applied to the clamping member 31 by the spring 38 which allows the clamping member 31 to move into the plunger 32 during the further downward movement of the latter after the clamping member has come to rest against the top of a bottle.

Each pedestal 8, after a bottle has been clamped thereon, is rotated while it is passing through a distance of just over one pitch in front of a diffused light source 39 which illuminates the total side wall surface of the bottle, excluding the case. The cylindrical wall 9 is provided with a plurality of vertical narrow scanning slits 40 respectively radially aligned with the vertical axis of each pedestal, the wall 9 and the slits therein moving with the bottles. Within the wall 9 is arranged a vertical stack of photocells 41 carried from the stationary top plate 37, and an optical system 42 comprising a cylindrical array of lenses carried from and rotating with the turret table 10, each vertical row of lenses being arranged to form images of parts of the associated slit 40 on the photocells 41. The angle through which the turret moves while a bottle is being inspected corresponds approximately to one pitch, and an opaque screen 43 carried from the top plate 37 and having a vertical opening or group of openings 44 may limit the viewing range of the photocells. The width of the opening or openings 44 may be adjustable by side shutters 45. The opening 44 may be covered by a glass plate 46. During inspection the bottle is rotated through a complete revolution. Since each slit 40 is near the wall of its associated bottle, any foreign body on the wall of the bottle will alter the intensity of the light and will cause a signal to be obtained from one or more of the photocells 41, which signal, after storage in a memory device, is used to operate the reject mechanism when the defective bottle reaches the reject stage.

By using a slit and rotating the bottle, variations in the shape of the bottle can be ignored. By using a stack of several photocells, the sensitivity of the cells for examining various parts of the bottle can be adjusted so that the effects of moulded-in names and ridges around the neck of the bottle can be reduced. Experiments have shown that by employing a diffused light source a moulded-in name on the glass is not detectable, although the presence of glass chips, foreign bodies or dirt is detected. Any signal from a moulded-in name will generally be received on a given number of cells and can be processed so that the signal is integrated rather than differentiated, and since the name, if it gives any signal at all, gives increased as well as decreased light variations, the integration will tend to average these out and minimise any effect of the name. Near the bottom of the bottle the signal may vary slightly due to variations in the base of the bottle, but this effect can be minimised by making the signal from the photocells which scan this part of the bottle sensitive to sudden changes rather than to slow undulations. Any vertical seam on the bottle will in general affect all the photocells the same and by applying logic to the signal obtained from the bottles the seam can easily be recognised and the signal therefrom rendered ineffective on the rejecting apparatus.

Various optical systems can be used. Instead of the arrangement illustrated in the drawing, a cylindrical lens can be used. The lenses may be dispensed with if wide strip photocells are placed very close to the slits so that as the turret rotates the image of the slit is formed straight onto the photocells.

Base inspection takes place in the input star 2 as the bottle is moving over a diffused light source indicated by the rectangle 47. When the bottle moves from the conveyor 1 into this star, it first slides on a base plate, but while it is travelling over the light source 47 the bottle must be firmly held in its star recess 48 so that its base is completely free from all obstruction. This is diagrammatically shown as being effected by grippers 49 each of which can be moved from an open position in which a bottle can freely enter or leave the associated star recess to a gripping position in which the bottle is firmly held in the associated star recess. The grippers are actuated in sequence, e.g. by a cam or solenoids, so that, after a bottle has been guided into a recess 48 by the plough 50, the associated gripper 49 will grip the bottle while it is moving over the stationary diffused light source 47 mounted beneath an opening in the base plate 51 (see FIG. 3), and again releases the bottle to permit its transfer to a pedestal 8 of the side inspection unit 4. The diffusing screen is arranged to be as close as possible to the base of the bottle without actually touching it. The wide angle illumination thus obtained results in the virtual disappearance from the resulting image of such features as irregularities in glass, embossed makers' names or small scratches.

Immediately above the top of the bottle is arranged a metal plate 52, and between this plate and the bottle is a lens 53 which is constrained to swing in step with the movement of the bottle over the diffusing screen. The effect of this is to hold the image of the inside surface of the base of the bottle, as viewed from the top, stationary on the metal plate for the short period of time that the base of the bottle is being inspected.

In the metal plate 52, which is conveniently circular and mounted for rotation in bearings 54, is a narrow radial or diametric slit 55 so that, viewed from above, all that can be seen is a narrow radial or diametric section of the image. The metal plate 52 containing the slit is rapidly rotated so as to scan the whole of the image of the base during the time that the image is held stationary by the lens 53. The radial scanning ensures that a constant area of the bottle base is viewed at each instant of the scanning process, and to some extent averages out the effect of mould marks and scratches on the base which have a tendency to become circumferentially disposed, thus causing no sudden change in light intensity at successive instants of time during the scanning process.

An auxiliary lens 56, which may be in contact with the plate 52 and rotate with it, is arranged to throw the image of the first lens 24 onto a photocell 57. The auxiliary lens 56 avoids spatial variations in the intensity of the light reaching the photocell. Variations in the signal from the photocell 57 caused by variations in the intensity of illumination at the photocell due to the presence of dirt or a foreign body in the bottle which interrupts the light path, are used to determine whether the bottle base is dirty or not. In order to eliminate the effect of variations in the intensity of light falling on the diffusing screen or variations in thickness of the bottle base, it may be necessary to use a differentiated output rather than a direct output from the photocell for storage in the memory device. It is possible that at the same time as the base is inspected an inspection of the bottle lip can also be carried out for chip detection.

The machine may also include means for gauging the diameter of the locking ring at the neck of the bottle, any incorrectly sized bottle producing an output signal which is fed to the memory device so that that bottle will be rejected in the reject stage of the machine. Conveniently the neck gauging means may be associated with the input star 2 and may comprise a pair of sensing fingers which are engaged by the necks of the bottle as they move therepast to close a pair of contacts only when the bottle neck is of the correct size, within the usual limits.

After passing through the inspection devices in the input star 2 and the side inspection unit 4, the bottles are transferred to the output star 5, which, like the input star 2, is provided with grippers 58 which may be moved from an open position to a gripping position. These grippers may be independently actuated, for example by solenoids, under control of the memory device, so that if any of the inspection devices has shown a bottle to be faulty, the gripper associated with that bottle, when moving in the output star 5, will be actuated to grip the bottle therein and prevent it from being discharged on to the conveyor 1. Reject bottles (such as indicated at 30a) are thus moved against the guide 59 before being released by the associated gripper and discharged on to a reject conveyor.

FIGURE 4 shows a block circuit diagram of the means for controlling the reject mechanism in dependence upon the signals produced by the inspection devices.

Any output voltage pulse produced by a photocell strip 41 when a foreign body passes across the side inspection slit, is amplified by its individual pulse amplifier 60, the gain of which is adjustable so that the sensitivity can be set for optimum for any part of the bottle.

As illustrated there are six photocell strips associated with each lens of a vertical row. The outputs from each group of six amplifiers are fed into a circuit 61, comprising a combined "OR" gate and pulse height discriminator, which will give an output pulse if one (or more) of the input pulses exceeds a pre-set amplitude. All the amplifiers could alternatively be fed into one circuit 61, but the arrangement shown enables the sensitivity of five areas of the bottle to be set independently by adjusting the pre-set discrimination level. Another advantage of this system is that parallel operation of the inspection is maintained until after the critical discrimination stage; this means that if one discriminator circuit was to cease to work, some inspection would still take place.

The outputs from the discriminator stages 61 are fed into an "OR" gate 62 which will give an output pulse if one or more of its inputs receives a pulse. The pulse at this stage can vary in duration depending on the size and shape of the foreign body causing it. The "OR" gate 62 is followed by a pulse shaper circuit 63 to ensure that the pulse is the right size and shape to feed into the memory device.

As one bottle leaves the side inspection area and the next enters it, there is a short period when neither bottle is being inspected. This period is to enable the memory device to progress to the next position so that it is ready to receive any reject signal from the following bottle. Another reason for this period is that there is a possibility of a slight overlap between inspections which could generate a signal simulating a foreign body. This "dead" period is obtained by switching-off the signals from the pulse shaping circuit 63 by means of a gate circuit 64. The timing for this gate circuit 64 is obtained from a disc 65 with holes 66a, 66b in it driven in synchronism with the machine and a system of photocells 67a, 67b and lamps 68a, 68b. The gate 64 is closed when the smaller holes 66a in the disc 65 allow the light from lamp 68a to fall on the photocells 67a. When the gate 64 is open, a reject pulse can pass to the memory device 69. A suitable circuit for one stage of the memory device is described in an article entitled "A Transistor Shift Register" in "Electronic Engineering" May 1963, page 321. The number of stages required in the memory device is determined by the number of possible bottle positions around the machine from the first inspection position to the reject position.

Any pulse obtained from the base inspection phototransistor 57 is amplified by the pulse amplifier 70, the gain of which is adjustable to enable the sensitivity of the system to be varied. The pulse is then fed into the pulse height discriminator 71 and then on to the pulse shaper 72 if its amplitude is sufficient to operate the discriminator 71. The output from the pulse shaper 72 passes through the gate circuit 73 which is only open when a bottle is being inspected. The large signals obtained as the teeth of the input star 2 pass the inspection area are not passed on to the memory device because the gate 73 is closed during this period. The timing for the gate circuit 73 is controlled by the pulses obtained from larger diameter holes 66b in the inspection timing disc 65, which pulses are amplified by the amplifier 74. The gate is open when the holes 66b allow light from the lamp 68b to fall on to the photocell 67b. The reject pulses are fed into the memory device 69 at the appropriate position a few stages back from the side inspection signals. This is because the base inspection precedes the side inspection.

The contacts of the neck gauging unit 75, when closed by a bottle of correct size, close a gate circuit 76 so that the pulses obtained from the holes 66b of the timing disc 65 will not pass through it. If the bottle neck is of incorrect size, the gate 76 remains open and the pulse will pass to the pulse shaper 77 and then on to the memory device 69.

The information in the memory device 69 is stepped forward one position 5 milliseconds after the end of each side inspection by a pulse fed through the delay device 80. A suitable delay device is described in U.S. Patent 3,165,648. When the final stage is reached one or other of its transistors will be cut off depending upon whether the corresponding bottle is a reject or not. The output from the last stage is amplified in the amplifier 78 and used to operate the reject solenoid 79.

Whilst an embodiment of the invention has been diagrammatically illustrated and described, it will be understood that various modifications may be made without departing from the scope of the invention. For example, instead of providing each slit of the side inspection apparatus with its own lens system, it is possible to employ a single lens system common to all the vertical slits.

We claim:
1. Apparatus for optical scanning the side wall of a bottle to detect dirt or foreign bodies in the bottle, comprising a rotatable pedestal on which the bottle to be inspected is rotated in front of a diffused light source which illuminates the side wall of the bottle, means defining a narrow slit disposed to that side of the bottle opposite to the light source, and substantially parallel to the axis of the bottle, a plurality of photo-sensitive devices arranged in a row and substantially parallel to the slit so as to be illuminated by light from said source which passes through the bottle and said slit, an optical system for focussing an image of the side wall of the bottle adjacent to the slit on to the photo-sensitive devices.

2. Apparatus as claimed in claim 4, comprising a plurality of pedestals mounted on and advanced continuously by a turrent turning about a vertical axis, a plurality of separate vertical slits each associated with a pedestal respectively and moving therewith as the turret turns, and means for placing bottles to be inspected on the pedestals in turn and for removing the bottles from the pedestals after inspection.

3. Apparatus as claimed in claim 2, in combination with an optical scanning apparatus including a photo-electric cell for inspecting the base of the bottle, means for feeding the bottles in sequence through the apparatus for scanning the side wall and the base, a memory device in which the output signals from the photo-sensitive devices and the photo-electric cell are stored, and means controlled by said memory device for rejecting any bottle which either the photo-sensitive devices or the photo-electric cell has detected as being dirty.

4. Apparatus as claimed in claim 3, wherein the means for optically scanning the base of a bottle comprises means for holding the bottle so that its base is completely clear of obstruction while the base is illuminated by a diffused light source, optical means being provided for producing an image of the illuminated base, which image is scanned by a rotating slit arranged in front of the photo-electric cell.

5. Apparatus as claimed in claim 4, wherein the bottles are continuously advanced while the base of a bottle is being scanned, optical means being provided for maintaining the image of the base substantially stationary while it is being scanned by the rotating slit.

6. Apparatus as claimed in claim 2, comprising also a cylindrical array of lenses arranged in vertical rows mounted to turn with the turret, each vertical row of lenses being associated with one of the vertical scanning slits.

7. Apparatus as claimed in claim 6, wherein the row of photo-sensitive devices is arranged within the cylindrical array of lenses, and an opaque screen having at least one vertical opening is located between the lenses and the vertical slits to limit the viewing angle of the photo-sensitive devices.

References Cited
UNITED STATES PATENTS

| | | | |
|---|---|---|---|
| 2,253,581 | 8/1941 | Reynolds | 88—14 X |
| 2,593,127 | 4/1952 | Fedorchak | 250—223 X |
| 2,878,711 | 3/1959 | Blackstone | 250—236 X |
| 3,029,349 | 4/1962 | Schell | 250—223 |
| 3,133,638 | 5/1964 | Calhoun | 209—111.7 X |
| 3,265,901 | 8/1966 | Schneider | 250—223 |

WALTER STOLWEIN, *Primary Examiner.*